United States Patent Office 3,102,295
Patented Sept. 3, 1963

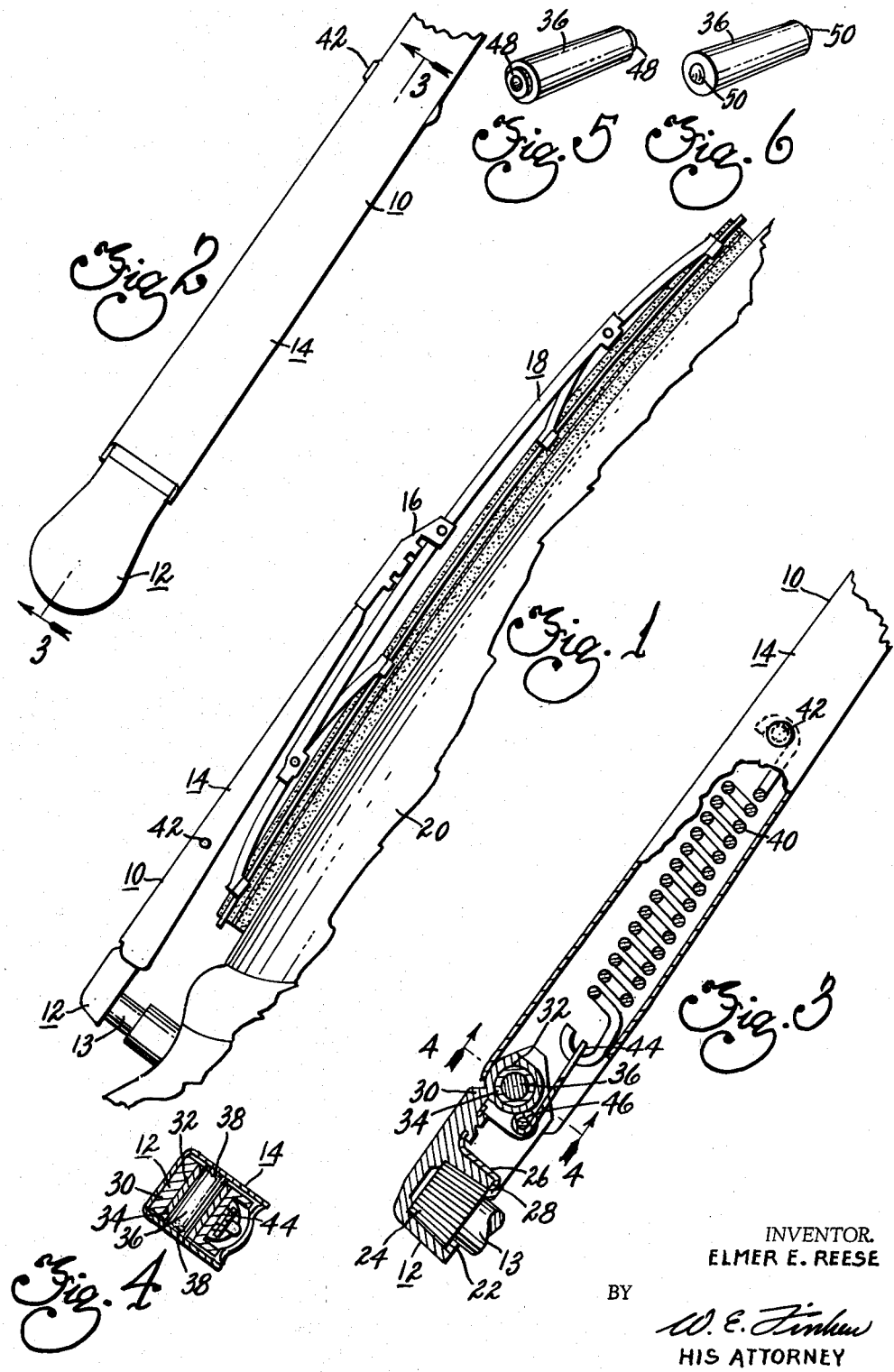

3,102,295
WINDSHIELD WIPER ARM
Elmer E. Reese, Rochester, N.Y., assignor to General Motors Corporation, Detroit, Mich., a corporation of Delaware
Filed Mar. 7, 1962, Ser. No. 178,200
7 Claims. (Cl. 15—250.35)

This invention pertains to windshield wiper arms, and particularly to an improved pivot joint between inner and outer sections of a spring biased windshield wiper arm.

Conventional windshield wiper arms comprise a socket section having driving engagement with an oscillatory pivot shaft and an outer extension section spring hinged to the inner section for carrying a wiper blade. It has been customary to use a pin at the pivot joint between the inner and outer arm sections, which pin may or may not be journalled in a bushing in the inner arm section and extends through an aligned aperture in the side walls of the outer arm section which straddle the radially extending portion of the inner arm section. The ends of the pin are usually peened over the side walls of the outer arm section, a typical pivot joint of this type being shown in the Wallis Patent 2,838,782. Obviously, in a pivot joint of this type the holes in the side walls of the outer section must be of slightly greater diameter than that of the pin due to the normal manufacturing tolerances, and these tolerances result in looseness at the joint causing premature wear and failure of numerous wiper arms. It is pointed out that the length of wiper arms has steadily increased over the years, and at the present time it is not at all uncommon to have wiper arms which are sixteen inches or longer, and with the outer section being fifteen inches or longer. Moreover, with the larger windshields on numerous vehicles, the wiper blades have been increased in length up to eighteen inches with corresponding increases in the strength of the pressure applying spring so as to obtain the optimum pressure of one ounce per inch of blade length. Naturally, all of these factors place a greater fluctuating load on the pivot joint between the inner and outer sections due to the increased pressure, the increased moment arm, and the increased mass of the wiper arm and blade assemblies.

The present invention relates to an improved pivot joint between inner and outer wiper arm sections wherein there is no looseness between the pin and the outer arm section thus minimizing wear at the pivot joint. Moreover, the improved pivot joint is not visible exteriorly of the outer arm section thus greatly improving the over-all appearance of the wiper arm, as well as significantly improving the structural integrity thereof. Accordingly, among my objects are the provision of an improved pivot joint between the inner and outer sections of a windshield wiper arm; and the further provision of a pivot joint including a pin which is welded to the outer arm section at the inner surfaces thereof so as to eliminate looseness in the joint and improve the over-all appearance of the wiper arm.

The aforementioned and other objects are accomplished in the present invention by journalling the pin in a sleeve bearing extending substantially transversely of the longitudinal axis of the wiper arm, and resistance welding the opposite ends of the pin to the inner surfaces of the outer arm section. Specifically, the improved pivot joint disclosed is in conjunction with a wiper arm having a seam welded tubular outer arm extension of the general type disclosed in Ziegler application Serial No. 12,993 filed March 7, 1960, and assigned to the assignee of the present invention.

The wiper arm includes a die cast inner, or socket, section having a recess for receiving a drive burr attached to an oscillatory pivot shaft. The inner arm section has a radial extension, a portion of which is straddled by the tubular outer arm section. This radial extension has a transverse bore receiving a sleeve bearing within which a pin is journalled. The ends of the pin are projection welded to the inner surface of the outer arm section thereby forming a pivot joint which is completely concealed from the exterior of the wiper arm. A conventional extension spring may be used to bias the outer arm section relative to the inner arm section and apply pressure to a wiper blade carried by the wiper arm for maintaining the wiper blade in contact with a windshield.

Further objects and advantages of the present invention will be apparent from the following description, reference being had to the accompanying drawing, wherein preferred embodiments of the present invention are clearly shown.

In the drawing:

FIGURE 1 is a fragmentary view, in elevation, of a vehicle equipped with the improved wiper arm construction of this invention.

FIGURE 2 is a fragmentary plan view of the improved wiper arm construction.

FIGURE 3 is a longitudinal sectional view taken along line 3—3 of FIGURE 2.

FIGURE 4 is a transverse sectional view taken along line 4—4 of FIGURE 3.

FIGURE 5 is an isometric view of the preferred pin construction.

FIGURE 6 is an isometric view of a modified pin construction.

With reference to the drawing, a wiper arm 10 is shown comprising an inner, or socket, section 12 drivingly connected to the oscillatory pivot shaft 13, and spring hinge connected to a seam welded tubular outer arm section 14. The outer arm section is detachably connects to a clip 16 which is pivotally mounted on the superstructure of a wiper blade assembly 18 for cleaning the outer surface of a windshield 20. As seen in FIGURES 2 and 3, the inner arm section 12 has a blind socket recess 22 which is serrated and receives a serrated drive burr 24 attached to the pivot shaft 13. Thus, the inner arm section 12 is connected for angular movement with the pivot shaft 13. In accordance with conventional practice, the inner arm section 12 may include a spring latch 26 which projects through a side wall opening 28 in the socket recess 22 for engagement with the lower edge of the burr 24 so as to retain the arm in assembled relation with the pivot shaft.

In addition, the inner arm section 12 includes a radial extension 30 having a transverse bore 32 which receives a sleeve bearing 34. A pin 36 is journalled in the sleeve bearing 34, end portions of the pin projecting slightly from the sleeve bearing 32, as will be pointed out more particularly hereinafter. The ends of the pin 36 and a portion of the radial extension 30 are enclosed by the inner end of the tubular outer arm section 14, and as seen in FIGURE 4, the side walls of the tubular outer arm section 14 straddle a portion of the radial extension 30. The pin 36 is rigidly connected to the side walls of the outer arm section 14 by resistance projection welds 38. Accordingly, there is no looseness between the outer arm section 14 and the pin 36, and the weldments 38 are not visible from the exterior of the wiper arm, this being clearly indicated in FIGURE 1.

The outer arm section 14 is biased towards the windshield 20 for applying pressure to the wiper arm 18 by an extension spring 40, the outer end of which engages a pin 42 extending transversely through the side walls of the outer arm extension, and the inner end of which engages a retainer 44 supported on a pin 46 extending between the side wall webs of the radial extension on the inner arm section 12. The extension spring 40 functions to bias the outer arm section 14 in a clockwise direction about the inner arm section 12 as seen in FIGURES 1 and 3.

With reference to FIGURES 5 and 6, two modifications of pins are disclosed. In the preferred embodiment, each end of the pin 36 is formed with a coaxial ring projection 48 to facilitate the projection welding operation. In the modification of FIGURE 6, each end of the pin 36 is formed with a central axial projection 50, which may be substantially hemispherical.

While the embodiments of the invention as herein disclosed constitute preferred forms, it is to be understood that other forms might be adopted.

What is claimed is as follows:

1. A windshield wiper arm including, an inner section adapted for attachment to a pivot shaft and having a radial extension, an outer arm section having side walls straddling at least a portion of the radial extension of the inner arm section, a transversely extending pin journalled in the inner arm section, and welds attaching the ends of said pin to the inner surfaces of the side walls of the outer arm section to establish a pivot joint between the inner and outer arm sections.

2. A windshield wiper arm including, an inner section adapted for attachment to an actuating shaft and having a radial extension, a transverse bore through said radial extension, a sleeve bearing disposed in said transverse bore, a pin journalled in said sleeve bearing and having exposed ends, an outer arm section having side walls straddling at least a portion of said radial extension, and welds between the ends of said pin and the inner surfaces of said outer arm section for establishing a pivot joint between the inner and outer arm sections.

3. A windshield wiper arm including, a socket section adapted for attachment to an actuating shaft having a radial extension, a pin journalled in said radial extension, a tubular outer arm section having side walls straddling at least a portion of said radial extension, and welds rigidly interconnecting the ends of said pin and the inner surfaces of said side walls of the outer arm section to establish a pivot joint between said socket section and the outer arm section.

4. A windshield wiper arm including two telescopically arranged parts, and a pivot joint connection between said parts comprising a pin journalled in the inner part having its ends welded to the inner surface of the outer part.

5. A windshield wiper arm including two telescopically arranged parts, and a pivot joint connection between said parts comprising a sleeve bearing carried by the inner part and a pin journalled in said sleeve bearing having its ends welded to the inner surface of the outer part.

6. The wiper arm set forth in claim 5 wherein the ends of said pin have ring projections.

7. The wiper arm set forth in claim 5 wherein the ends of the pin have central axial projections.

References Cited in the file of this patent

UNITED STATES PATENTS 2,997,727     Ziegler _____ Aug. 29, 1961

OTHER REFERENCES

"How and Where To Use Electric-Furnace Brazing," by General Electric; Sept. 8, 1938, pages 5 and 6.